United States Patent [19]

Kuo

[11] Patent Number: 5,606,627
[45] Date of Patent: Feb. 25, 1997

[54] AUTOMATED ANALYTIC STEREO COMPARATOR

[75] Inventor: Shihjong Kuo, Slidell, La.

[73] Assignee: Eotek Inc., Red Oak, Tex.

[21] Appl. No.: 378,257

[22] Filed: Jan. 24, 1995

[51] Int. Cl.⁶ .................................................. H04N 13/00
[52] U.S. Cl. ........................... 382/154; 382/294; 348/159
[58] Field of Search ..................... 382/106, 108,
382/109, 154, 266, 294; 348/42, 144, 159;
356/2, 3, 12; 33/20.4; 354/65, 68, 113

[56] References Cited

U.S. PATENT DOCUMENTS

| | | | |
|---|---|---|---|
| 3,116,555 | 1/1964 | Helava | 33/20 |
| 4,539,701 | 9/1985 | Galbreath et al. | 382/154 |
| 4,695,959 | 9/1987 | Lees et al. | 356/3 |
| 4,951,136 | 8/1990 | Drescher et al. | 348/42 |
| 5,113,137 | 5/1992 | Koizumi et al. | 382/275 |
| 5,220,441 | 6/1993 | Gerstenberger | 348/42 |
| 5,309,522 | 5/1994 | Dye | 382/41 |
| 5,345,086 | 9/1994 | Bertram | 356/12 |

OTHER PUBLICATIONS

Manual of Photogrammetry, 4th Ed. Jun. 1980, Published by the American Society of Photogrammetry.

*Primary Examiner*—Leo Boudreau
*Assistant Examiner*—Chris Kelley

[57] ABSTRACT

A method and an apparatus are disclosed that extract digital elevation data from a pair of stereo images with two corresponding sets of airborne control data associated with each image of the stereo image pair. Point and edge features are identified from the stereo image pair, projected from respective camera stations of the stereo images onto a horizontal projection plane using respective set of airborne control dam including respective positions of a camera station, the interior orientation and calibration data of the camera, respective roll angles, respective pitch angles, respective yaw angles of each image, and respective flight bearing angles. The space coordinate of each projection are compared in object space to obtain an object-space parallax. The topographic elevation of each feature is derived from said object-space parallax, a base length, and the altitude of a camera station autonomously to eliminate the need for stereoscopic viewing device or ground control data.

14 Claims, 12 Drawing Sheets

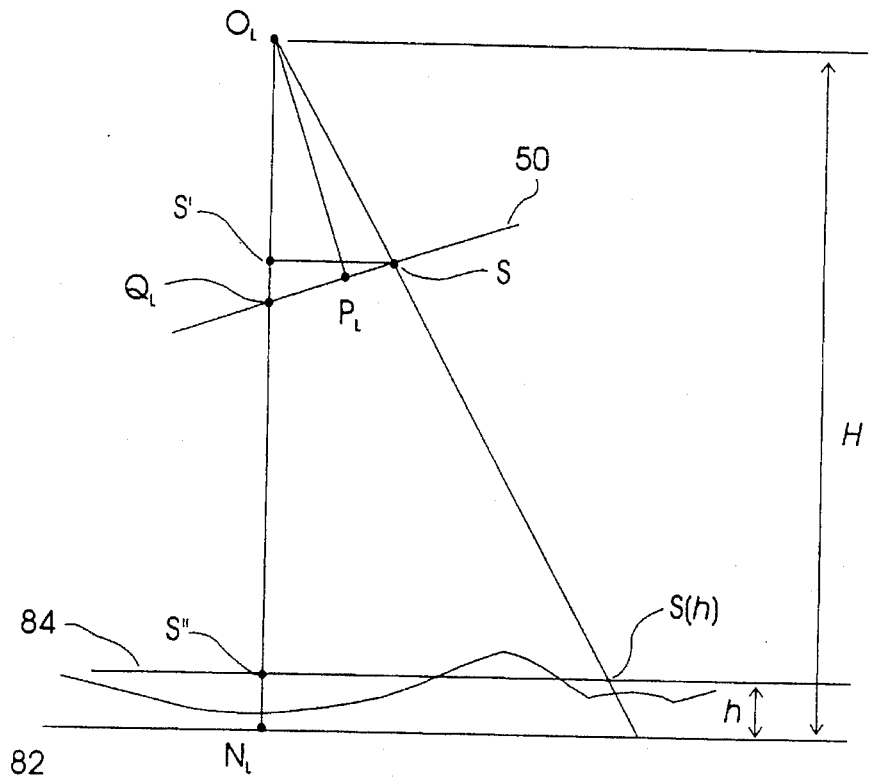
FIG. 8
FIG. 11
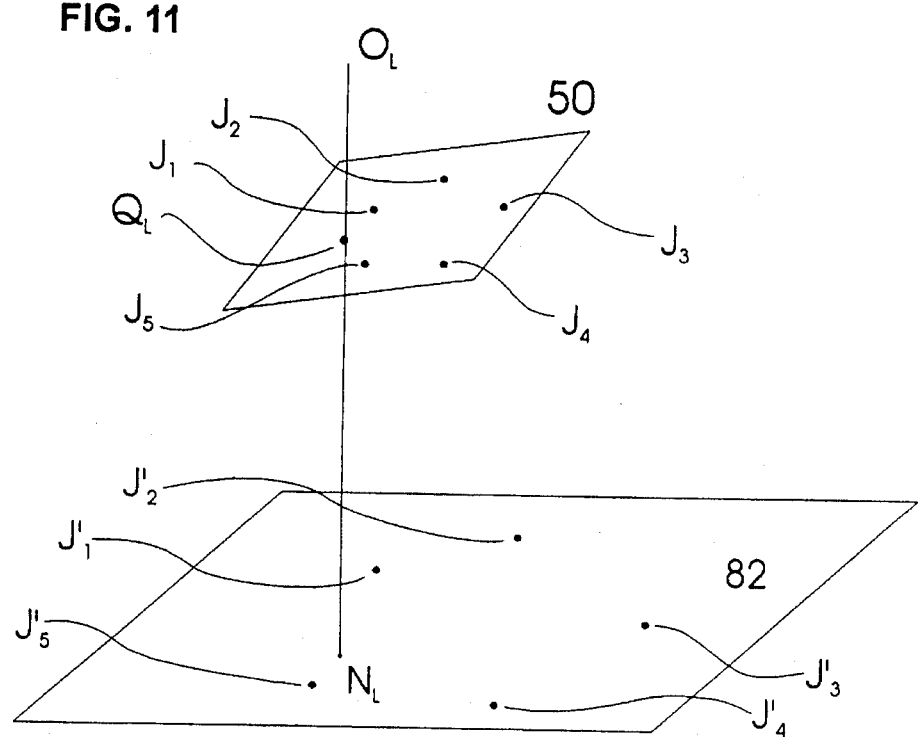

AUTOMATED ANALYTIC STEREO COMPARATOR

TECHNICAL FIELD

The present invention relates to a method and apparatus of extracting topographic elevation information from a pair of stereo images with known image characteristics, particularly to an automated process of extracting digital elevation databases from raw images.

BACKGROUND ART

U.S. Patents

| U.S. Pat. No. | Inventor | Issue Date |
|---|---|---|
| 3,116,555 | Helava | 01/1964 |
| 5,309,522 | Dye | 05/1994 |

Publications
Manual of Photogrammetry, 4th Ed. 1980, published by the American Society of Photogrammetry Presently, topographic maps that contain terrain elevation information are produced using photogrammetric instruments such as stereoplotters. There are three types of stereoplotters: (1) analog stereoplotters, (2) analytic stereoplotters, and (3) softcopy stereoplotters. Softcopy stereoplotters are more capable of automated processing than analytic stereoplotters through extensive use of modern computer technology and digital image processing methods. Analytic stereoplotters are, in turn, more capable of automated processing than analog stereoplotters because of the former's use of computerized method to implement mathematical models to represent the stereo projection model. The discussion of the background will focus mostly on analytic stereoplotters and softcopy stereoplotters.

Stereoplotters utilize a pair of partially overlapping photographs, which are usually taken from an aircraft flying over an area of mapping interest, to extract topographic elevation information. Some of the characteristics of each photograph are known prior to elevation extraction, some are supplied through a process of aerotriangulation or by other means. The characteristics of the photographs that are important to elevation extraction include the three dimensional coordinates of the camera stations, the roll, pitch, yaw angles of the camera at the instant of each camera exposure, the interior orientation of camera, and a flight bearing angle of the aircraft. In stereoplotters, a stereo pair of photographs are utilized to construct a three dimensional (3D) model through stereoscopic viewing means to represent topographic surface of the area of mapping interest. When the stereo pair is viewed through stereoviewing instrument, the elevation of an image feature can be determined by measuring a stereo parallax of the image feature.

According to chapter 13 of "Manual of Photogrammetry", to measure the stereo parallax of an image feature in a stereo image pair using a stereoplotter or stereocomparator, an operator is required to perform at least three types of activities. These activities include:

a) setting up a relative orientation and an absolute orientation of a stereo model, which is a three-dimensional model formed by intersecting rays of an overlapping pair of photographs, b) specifying formula for correction and adjustment, c) collecting and editing elevation data for each image feature that is of interest.

In order to setup the proper orientation for a stereo model, a manual procedure, aided with the use of a stereo viewing instrument, is required to eliminate a y-axis component of the stereo parallax on at least five image points. The stereo parallax that is associated with an image feature that appears on two photographs taken at two different camera stations (or projection center) has an x-axis component (x-parallax) and a y-axis component (y-parallax) in general, where the x-axis is the direction of flight and the y-axis is perpendicular to the x-axis and parallel to the plane of the photograph. The y-axis component of a parallax needs to be eliminated so that a line in the stereo model that are established by two image points will remain in the same direction.

Specifying formulas for correction and adjustment allows stereoplotters to take into consideration various geometric distortions in the photographs that are caused by factors such as aberration of the camera lens, curvatures of the earth's surface, atmospheric effect, and other systematic errors.

To determine the elevation of an image feature after the stereo model is set up and the y-parallax is removed, stereoplotters employs a viewing aid, which is commonly referred to as a floating marker. The floating marker consists of a pair of movable dots, each of which is positioned on one of the stereo pair of photographs. When viewed through the stereoscopic viewing device, the floating marker provides to an operator an apparent vertical depth. The apparent vertical depth of the floating marker can be adjusted by the operator, so that under stereoscopic viewing, the floating marker may appear above, beneath, or coincident with the image feature of interest. Collection of a digital elevation database is accomplished by moving the floating marker to visit various image features in the overlapped region of the stereo pair, and collecting the apparent vertical depth of the floating marker at each image feature point when the floating marker coincides with the image feature under stereoscopic view.

As discussed above, the photogrammetric processing of stereo pair of photographs to generate digital elevation database is far from fully automated. The major deficiencies that are obstacles to fully automated operation are:

a) preparing diapositives of photograph from film negatives and loading diapositives, b) Identification of image feature, c) Stereo model setup, d) parallax measurement and data collection.

All four aspects of the stereoplotter operation requires manual intervention. U.S. Pat. No. 3,116,555 to Helava discloses an analytic stereoplotter that can produce digital elevation database, but suffers from its requirement to have a skilled operator to perform a) image point identification, b) stereo model setup, and c) parallax measurement and data collection. After elevation data collection is completed for each stereo model, new diapositives needs to loaded manually into the stereoplotter.

In softcopy stereoplotters, photographs are scanned into a digital format for computer processing, in contrast to analytic stereoplotters that use a transparent diapositive of the photograph. In digital format, each photograph is converted into an equally-spaced matrix array of intensity values (a raster image), and each pixel of the digital raster image is associated with a column and a row number measured from a center point or a principal point of the photograph. The principal point is the intersection of the optic axis of the camera with the film plane. The column and row coordinate measured on the plane of photograph is referred to as a photograph coordinate. Improvement in automation of extracting digital elevation databases have been made using digital image processing techniques including pattern matching and correlation. This is accomplished by:

a) Establishing an equally-spaced grid, on which digital elevation data is to be extracted, on one photograph of the stereo pair.

b) At each grid crossing, an image patch of suitable size is selected.

c) Using pattern matching techniques that is well known in the art, a corresponding image patch in the conjugate photograph is identified.

d) The corresponding photograph coordinate on the conjugate photograph of the grid crossing is then obtained from correlation methods that is well known in the art. This allows the determination of a parallax for the grid crossing in question.

e) The elevation at the grid crossing in question is determined from the x-parallax after the stereo model is set up by eliminating the y-parallax.

f) Repeating the above recipe from b) through e) on the rest of grid crossings results in a rasterized digital elevation model that can be generated on a computer autonomously.

In practice, automated extraction of raster digital elevation model by pattern matching and correlation techniques are far from achieving a satisfactory degree of accuracy when compared to results obtained by manual procedures practiced on analytic stereoplotters. Frequently, topographic features such as irregular break lines or isolated, sharp point features are not captured by this automated process. The reasons are:

a) The degree of success on using pattern matching techniques to identify similar image patches in a stereo image pair is influenced by many factors, such as image contrast, and image texture. It is easy to see that when the image patch does not contain objects of significant contrast or gradient variations, the results of pattern matching will be ambiguous.

b) Poor image contrast or gradient variation will also leads to greater errors in the results of correlation calculation of photograph coordinates.

c) Since image features or prominent terrain features that are of interest to map production can not be expected to fall on a regular grid pattern, rasterized digital elevation model can miss important topographic features such as break lines or isolated point features, unless the grid density is increased sufficiently. However, increasing the grid density in generating digital elevation data will lead to inefficiency and geometrically increasing computing requirement.

U.S. Pat. No. 5,309,522 to Dye discloses a novel approach to determine terrain elevation stereoscopically by forming additional, multiple sets of lower-resolution image sets and extracting edge features from these multiple resolution sets of stereo image pairs. The elevation information is built, in stages, from each stereo image pair at a given resolution by calculating the stereo parallax between corresponding edge features. While Dye's method makes claim that it can automate the generation of digital elevation databases from aerial photo or satellite images, it presumes that both of the stereo images are geometrically corrected, as the accuracy of the geometric correction will determine the accuracy of the extracted elevation data. While geometric correction is performed by methods that is well known in the art to generate mapping polynomials for transforming each image, the process of performing geometric correction is still manual and labor intensive. In addition, carrying out the geometric correction process will require ground control data that need to be acquired either from ground survey, or digitizing existing maps. Thus, the scope of automation that can be accomplished by Dye's method is limited. Specifically, Dye's method will not be able to generate digital elevation databases from raw image data autonomously.

According to the parallax formula that Dye's methods employs to calculate elevation:

$$Z = ZL \, (X1-X)/(X1-XL),$$

where Z is the true elevation, ZL is the height of a camera station, X1 is a projected location of the pixel of interest from one image, X is the true projected location of the pixel of interest, and XL is the location of the nadir point of the image being projected. The value of X1, X, XL is accurate only if the image is geometrically corrected. Consequently, the accuracy of extracted elevation is questionable when the image is not properly corrected for geometric fidelity. The term (X1–XL) is only a fraction of the base distance (XR—XL) of the stereo pair of images, and the fraction value varies as X1 changes. Thus, the resolution of extracted elevation value is coarser than other methods that uses the base distance (XR—XL). Also, varying values of (X1—XL) implies that the accuracy of extracted elevation value will vary accordingly, producing less consistent digital elevation model. It is also apparent that if the images are not georeferenced prior to being processed by Dye's method, the results of the elevation extraction is indexed only to photograph coordinates, but can not be indexed to geographic coordinates referenced to known Datum. Furthermore, the resolution of elevation determination is limited to the ground sampling distance divided by the partial base length (X1–XL) to height ratio. In addition, the generation of multiple resolution data sets implies that the amount of raster data to be processed will approach close to 1.5 times of the original raster image.

Thus it is recognized that previous methods and techniques disclosed in the art and practiced in stereoplotters in operation has accomplished automation only in individual tasks, manual operations are still required to proceed from one automated task to another task. Autonomous generation of digital elevation databases from raw image data is well beyond the degree of automation that has been accomplished in the art. The extraction of topographical elevation directly from mission medium containing unprocessed image data is greatly needed, but can not be accomplished by stereoplotters currently in use. Use of stereoscopic viewing device is a obstacle towards automated production of digital elevation database. The manual practice of setting up a stereo model by eliminating y-parallax inhibits autonomous operation of digital elevation data extraction.

GENERAL SUMMARY OF THE INVENTION

It is observed that although the exterior orientation, i.e. the location of camera station and the attitude parameters (roll/pitch/yaw angles), of an aerial photograph is traditionally derived from aerotriangulation; the exterior parameters of each photograph can be measured directly. Global Positioning System (GPS) equipment is being used frequently to determine the location of each camera station in aerial photography. Gyroscopic and leveling devices are frequently being used to measure attitude parameters. Camera parameters, such as the interior orientation and calibration data are known, and can be retrieved into computer memory by automated methods that are well known in the art.

Starting from the premise that an aerial image, whether it be a digitized photograph or raster image data from a digital imaging sensor, whose interior orientation, exterior orientations, and navigational data of the aircraft are known, an automated analytic stereocomparator that can generate digital elevation databases autonomously is disclosed. The preferred method of the present invention includes the steps of:

(a) retrieving a pair of aerial images (stereo image pair) that covers an overlapping, sufficiently large area of a terrestrial region, but are taken at two different camera stations, into a random access memory device, (b) retrieving two sets of airborne control data, each of which includes a camera station, a set of camera parameters, a roll angle, a pitch angle, a yaw angle, a flight bearing angle, for said pair of aerial images into said random access memory device, (c) extracting point and edge features from said stereo image pair using edge enhancing band-pass filters, (d) generating a list of common feature points from the overlapping region of said edge-enhanced stereo image pair using correlation techniques, (e) associating each entry in said list of common feature points with two pair of photograph coordinates, a first pair of photograph coordinate is associated with the left image of said stereo image pair, and a second pair of photograph coordinate is associated with the right image of said stereo image pair, (f) calculating a three dimensional space coordinate for a feature point in said common list of feature points, projected on a horizontal projection plane at a height h above a known reference Datum plane using said first set of airborne control data associated with said left image, (g) calculating a second three dimensional space coordinate for said feature point in said common list of feature points, projected on said horizontal projection plane at said height h above said reference Datum plane using said second set of airborne control data associated with said right image, (h) evaluating an object-space parallax between said first space coordinate and said second space coordinate associated with said feature point in said common list of feature points, (i) estimating the true elevation h' using said object-space parallax according to a parallax formula relating a base length of said stereo image pair, flight altitude, and said object-space parallax, (j) calculating a revised space coordinate projected on a new projection plane at said new height h' above said reference Datum plane, (k) proceeding to the next feature point in said list of common feature list and repeating the steps (f) through (j).

The objects and advantages of the present invention include:

(1) The method and apparatus disclosed in the present invention is applicable to both digitized film image as well as digital raster image data from digital imaging sensors.

(2) The present invention does not require any ground control data that are obtained by conducting a ground survey in order to perform photogrammetric processing.

(3) The present invention does not require any stereo-viewing equipment or stereo viewing perception by an operator.

(4) The present invention does not require setting up a stereo model by removing the y-parallax between a stereo image pair.

(5) Digital elevation data can be extracted directly from un-corrected image or from mission medium containing unprocessed data.

(6) The present invention extracts topographic elevation of all significant image features to improve the accuracy of autonomous generation of digital elevation data.

(7) The cost of extracting elevation information from raw image data is greatly reduced by eliminating the need for ground survey, eliminating the use of stereo viewing devices.

The above, and other objects, and advantages of the present invention will be apparent in the following detailed description and illustrative drawings.

BRIEF DESCRIPTION OF DRAWINGS

FIG. 8 shows a scaling geometry relating the magnification between a horizontal plane containing the feature point of a photo image and a projection plane at a height h above the reference Datum plane.

FIG. 11 shows a geometric relationship between 5 disjoint, non-collinear control points that are used to adjust the attitude angles of airborne control data for both the left and right images of a stereo image pair.

EXEMPLARY MODE FOR CARRYING OUT THE INVENTION

Figure 1A:
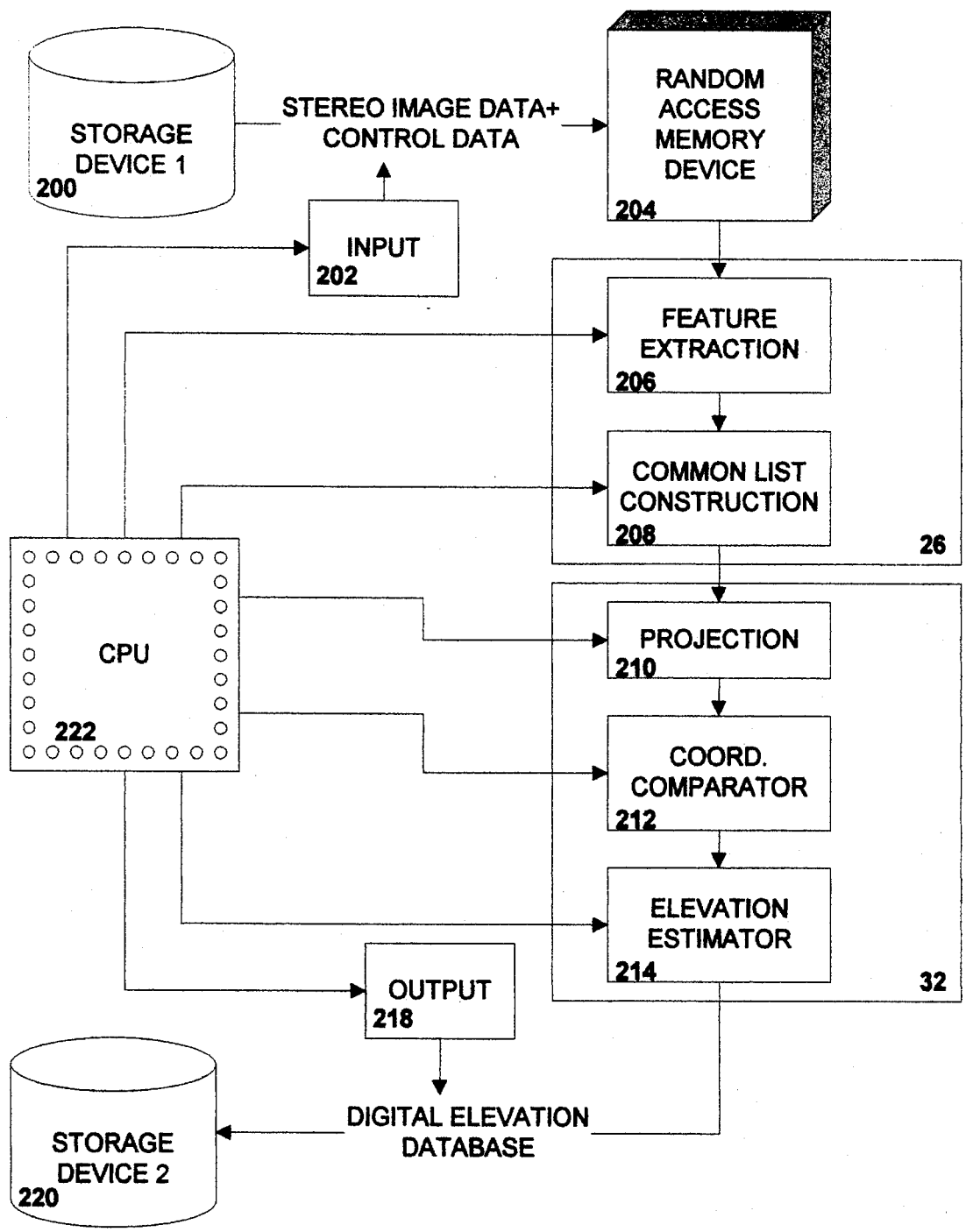
FIG. 1A shows the structure of the preferred embodiment of an apparatus to automate extraction of digital elevation from a pair of stereo images.

FIG. 1A shows the components of an exemplary, preferred embodiment of the structure of an automated analytic stereo comparator, including a first storage device 200, an input stage 202 for retrieving data into a random access memory device 204, a feature extraction stage 206, a common list construction stage 208, a projection stage 210, a coordinate comparator 212, an elevation estimator 214, an output stage 218, a second storage device 220, and a central processing unit (CPU) 222. Input data consisting of digital image data and airborne control data that characterize the position and attitude information of the photograph or digital image are stored in the first storage device 200. Input data are retrieved from the first storage device 200 through an input stage 202 into the random access memory device 204 under the control of the CPU 222 using conventional input/output techniques that commonly practiced.

Figure 1B:
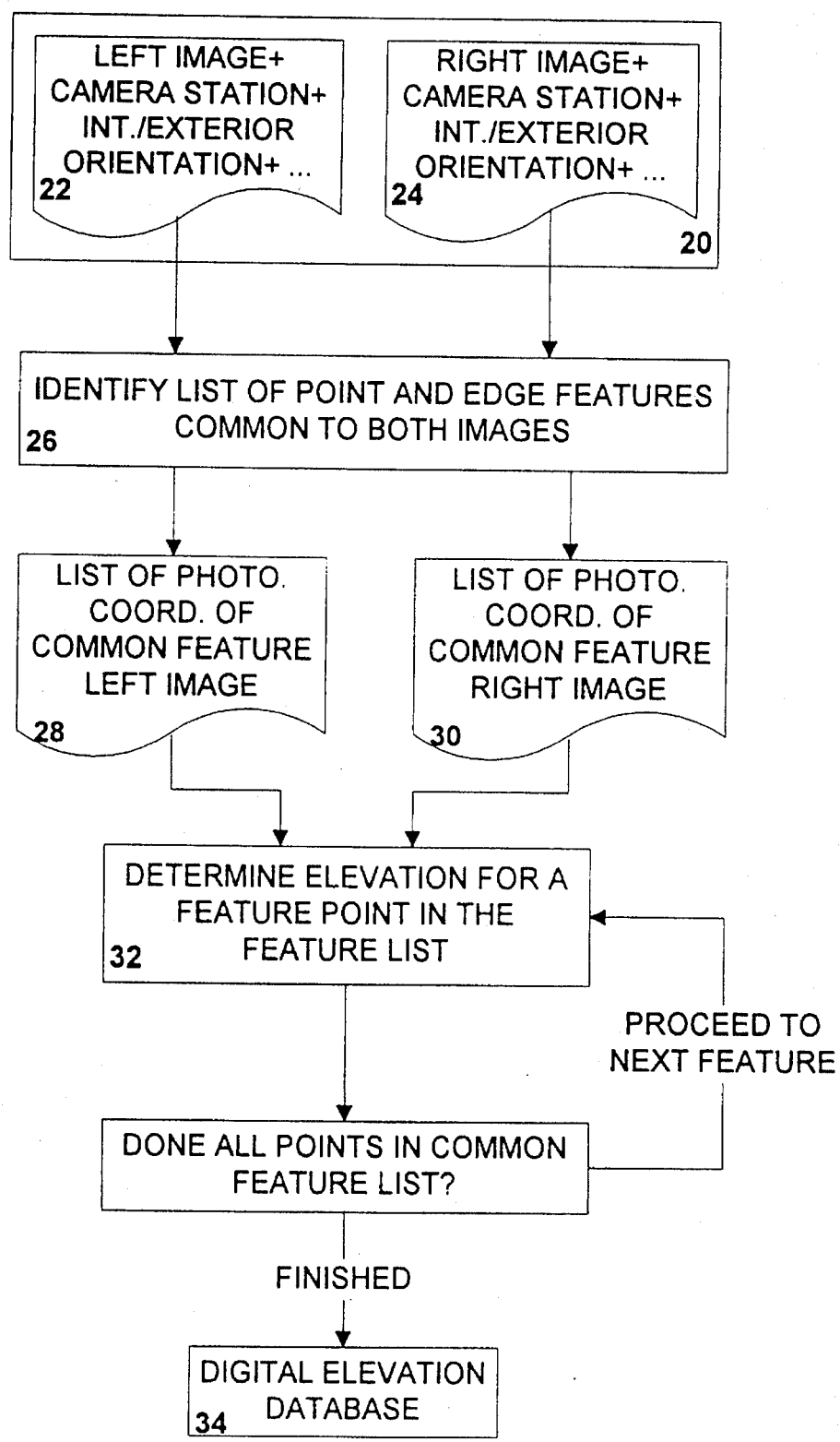
FIG. 1B is a block diagram showing the processes of automated extraction of digital elevation from a pair of stereo images in the preferred embodiment of the present invention.
Figure 2:
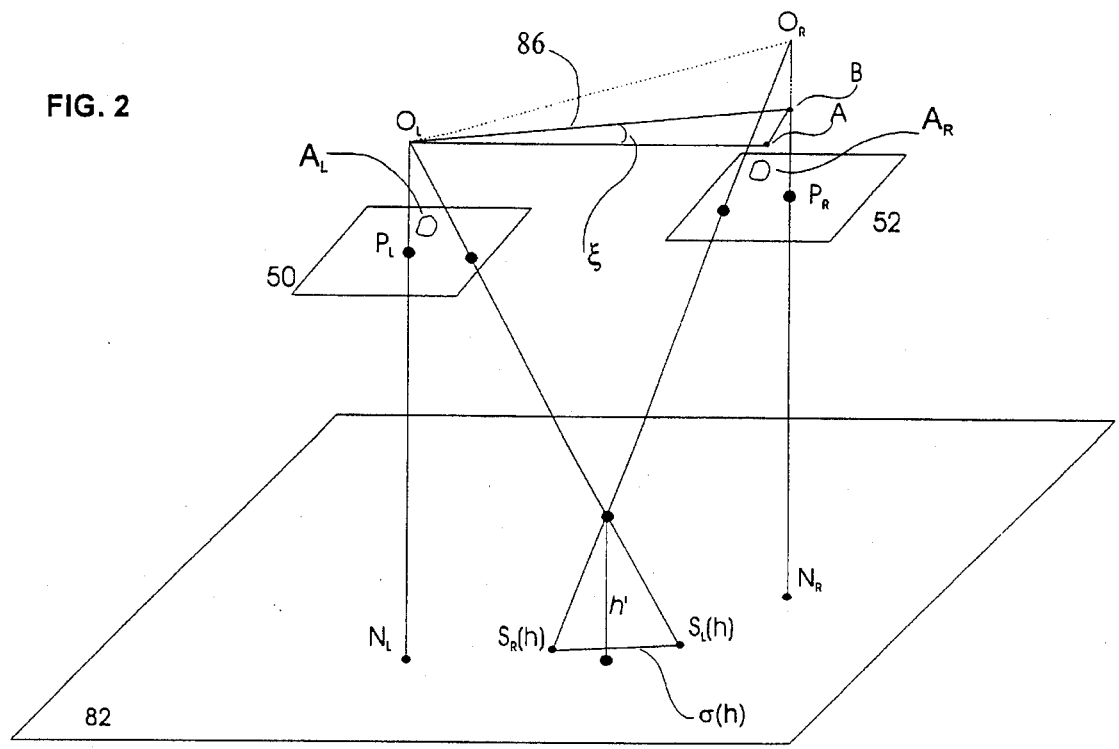
FIG. 2 illustrates the geometric relationship of a stereo pair of vertical images that are used in determination of terrain elevation.
Figure 3:
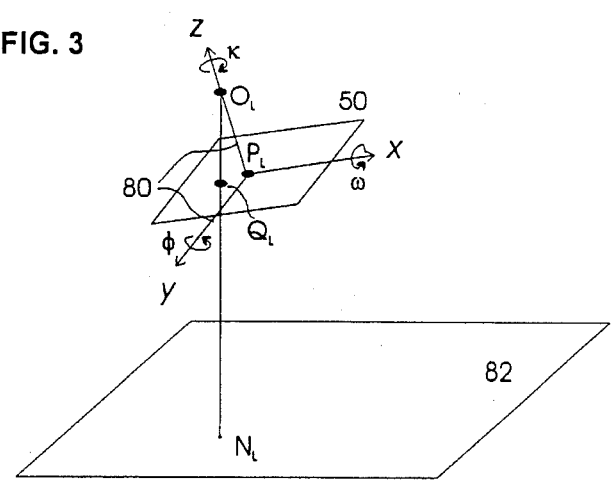
FIG. 3 illustrates the geometric relationship of a tilted image with respect to a camera station of the image and a reference Datum plane.

FIG. 1B shows a flow chart for the method of extracting digital elevation database from a stereo pair of images. In the preferred embodiment of the invention, a stereo image pair 20 is used to extract topographic elevation information. The stereo image pair 20 consists of a left image with a first set of associated airborne control data 22 and a right image with a second set of associated airborne control data 24. The stereo image pair 20 is taken from a vehicle moving at a distance sufficiently high above the ground in an arrangement shown in FIG. 2. The left image with the first set of associated airborne control data 22 consists of a photograph or a digital raster image, which will be referred to using the term left photograph 50 in the rest of this document, taken at a first camera station $O_L$, the space coordinate for the first camera station $O_L$, a set of camera parameters including interior orientation and calibration data, a flight bearing angle $\xi$, for the left photograph 50, and a first set of attitude parameters that include a roll angle $\omega$, a pitch angle $\phi$, and a yaw angle $\kappa$ of the left photograph 50, which is shown in FIGS. 2 and 3. The right image with the second set of associated airborne control data 24 consists of a second photograph (right photograph) 52, taken at a second camera station $O_R$, the space coordinate for the second camera station $O_R$, said set of camera parameters, a second flight bearing angle for the right photograph 52, and a second set of attitude parameters for the right photograph 52. The line $O_L B$ is the flight bearing direction for the left photograph 50, and the distance of $O_L B$ is a base length 86 of the stereo image pair.

In FIG. 3, the orientation of a tilted photograph is illustrated. A point $P_L$ is the principal point of the left photograph 50, which is the intersection of the optic axis of the camera with the film plane or detector plane. A point $Q_L$ is the nadir point of the left photograph 50, which is the intersection between a vertical axis $O_L N_L$ with the detector plane. A photograph coordinate system 80 is associated with the left photograph 50 in the stereo image pair 20. A second photograph coordinate system is associated with the right photograph 52. Each pixel in the left photograph 50 is referenced by a column and row number, which corresponds to the x-y coordinate in the photograph coordinate system 80. The pitch angle $\phi$ is measured between a vertical axis and the z-axis of the photograph coordinate system 80. The roll angle $\omega$ is measured between a horizontal plane and the x-y plane of the photograph coordinate system 80. The yaw angle $\kappa$ is measured between the photograph's heading direction $O_L A$ and the flight bearing direction $O_L B$ at the first camera station $O_L$. The line between the first camera station $O_L$ and the second camera station $O_R$ is a photo base of the stereo image pair 20. The three dimensional space coordinates of the first camera station $O_L$ and the second camera station $O_R$ are referenced to a known reference Datum 82, e.g. World Geodetic System '84 (WGS84).

Referring to FIG. 1B, digital elevation extraction starts from a common feature identification process 26 that includes the feature extraction stage 206 and the common list construction stage 208 to identify a list of point and edge features common to the stereo image pair 20. A first list of photograph coordinates 28 for the common point and edge features is calculated for the left photograph 50, and a second list of photograph coordinates 30 for the common point and edge features is calculated for the right photograph 52, This is followed by an elevation determination process 32 that includes the projection stage 210, the coordinate comparator 212, and the elevation estimator 214, to determine the elevation value for a point feature in the stereo image pair. The elevation determination process 32 is repeated for all feature points that are identified in the common feature identification process 26. At the end, a digital elevation database 34, which is a list of geo-referenced records of common point and edge features, is produced that each record consists of an elevation value with respect to the reference Datum 82, and corresponding geographic coordinate (e.g. Easting, Westing) with respect to the reference Datum 82, and cross-referenced to photograph coordinates from both the left photograph 50 and the right photograph 52.

Figure 4:
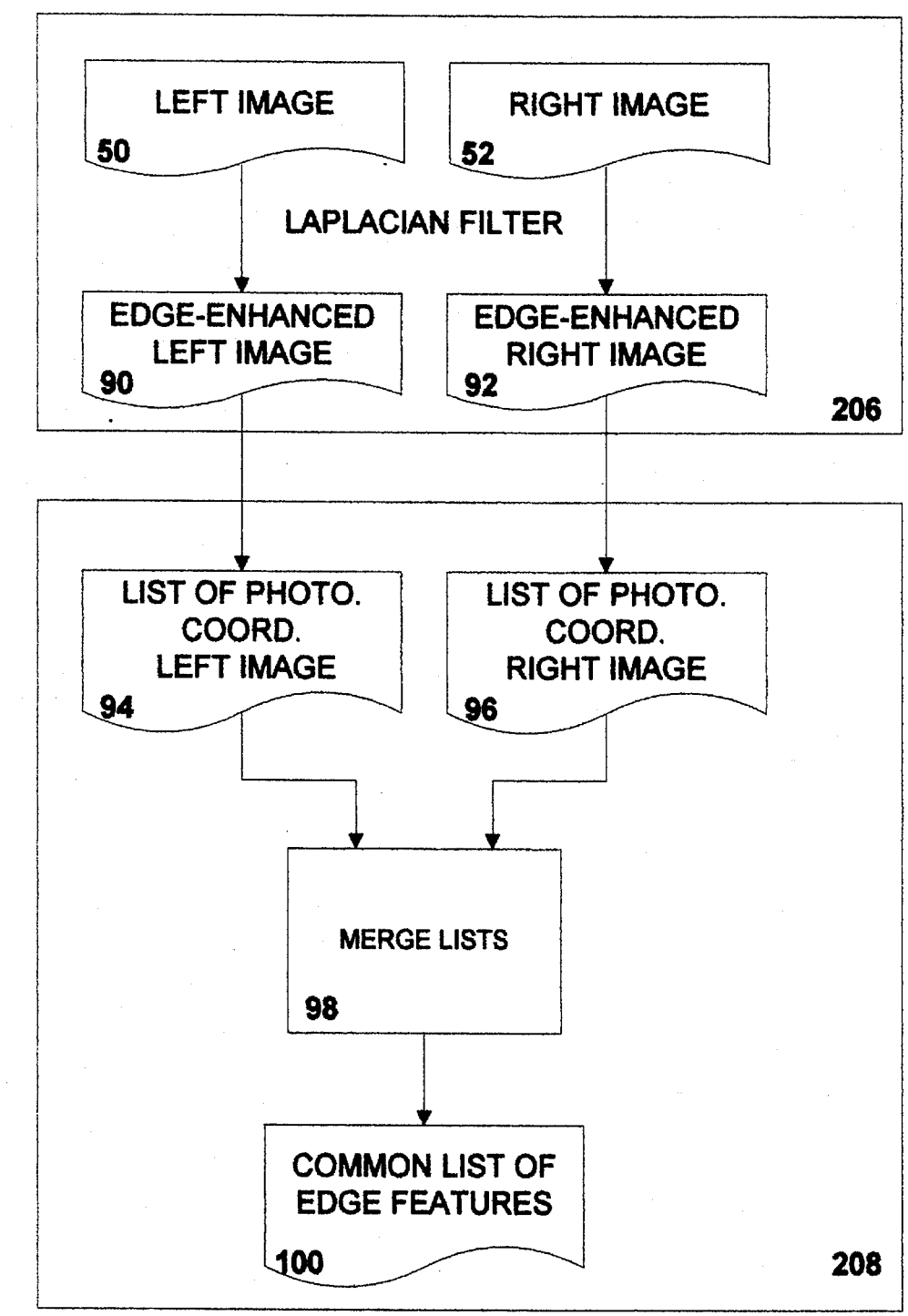
FIG. 4 is a diagram showing the process to identify and construct a list of point and edge features common to the stereo image pair.

Referring to FIG. 4, the common feature identification process 26 includes the feature extraction stage 206 and the common list construction stage 208. The feature extraction stage 206 utilizes the left image with the first set of associated airborne control data 22 and the right image with the second set of associated airborne control data 24, both of which are stored in the random access memory device 204. The left photograph 50 is analyzed using a band-pass filtering or edge enhancing method, such as a well-known Laplacian filter, to generate an edge-enhanced raster image 90. A first list of photograph coordinates 94 corresponding to point and edge features in the left photograph 50 is generated by enumerating the photograph coordinate of each pixel in the edge-enhanced raster image 90 that has pronounced contrast. A second list of photograph coordinates 96 corresponding to point and edge features in the right photograph 52 is generated by enumerating the photograph coordinate of each pixel in an edge-enhanced raster image 92 that has pronounced contrast. The common list construction stage 208 takes the first list of edge-feature photograph coordinates 94 and the second list of edge-feature photograph coordinates 96 to merge into a common list of edge and point features 100 for the stereo image pair 20 by a merge-list process 98. The common list of edge and point features 100 consists of the first list of photograph coordinates of common feature points 28 for the left photograph 22, and the second list of photograph coordinates of common feature points 30 for the right photograph 24.

Figure 5:
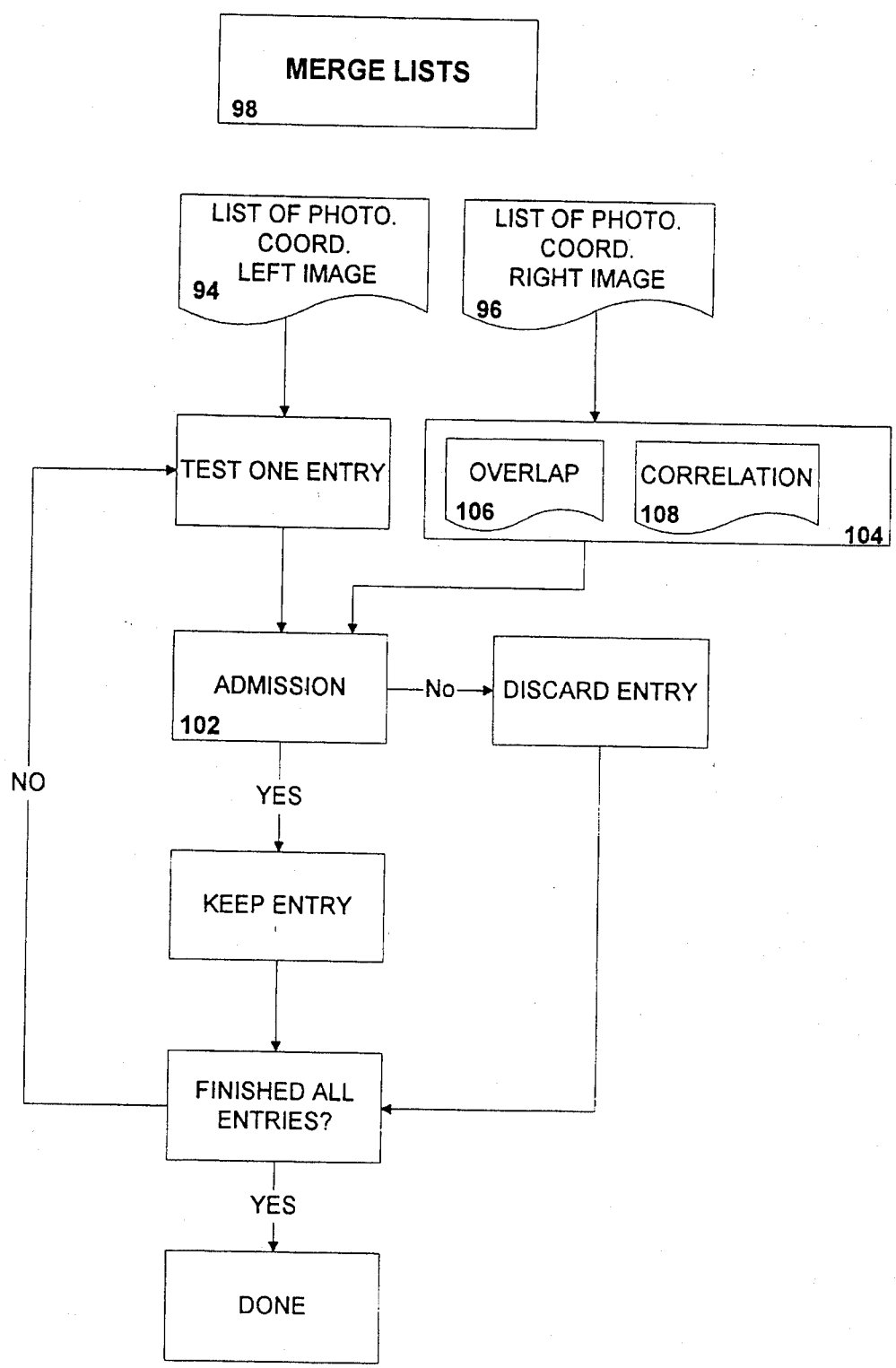
FIG. 5 is a block diagram illustrating the steps of merging separate lists of point and edge features from individual images into a common list of point and edge features.

Referring to FIG. 5, the first list of edge-feature photograph coordinates 94 for the left photograph 50 is enumerated one entry at a time in an admission process 102 that examines each entry against a set of admission criteria 104. Each entry that meets the set of admission criteria 104 is retained, along with a matching entry in the second list of edge-feature photograph coordinates 96. When all entries in the first list of edge-feature photograph coordinates 94 are enumerated and evaluated against the set of admission criteria 104, the generation of the common list of edge and point features 100 is completed. The set of admission criteria 104 consists of at least two parts: an overlap criteria 106, and a correlation criteria 108. The overlap criteria 106 tests whether the entry of interest is within an overlapping area in the stereo image pair 20. If the overlap criteria 106 is not met, the entry of interest from the first list of edge-feature photograph coordinates 94 is discarded, otherwise the entry of interest from the first list of edge-feature photograph coordinates 94 will be evaluated using the correlation criteria 108. The overlap criteria 106 is determined by an end-lap ratio, which is a known parameter equal to the ratio between the base length of the stereo image pair and the length of the ground coverage of the photograph image. The overlap criteria 106 may optionally be further refined from knowledge of the roll angles, the pitch angles, yaw angles of both the left photograph 50 and the right photograph 52.

The correlation criteria 108 is evaluated by selecting a first image patch of sufficient size, centered at the photograph coordinate associated with the entry of interest in the first list of edge-feature photograph coordinates 94, selecting a number of trial image patches of the same size, each of which is centered at a photograph coordinate enumerated from entries in the second list of edge-feature photograph coordinates 96, and calculating a degree of correlation for each pair of the first image patch and one of the trial image patches using a normalized convolution integration method. Let $I_L(x, y)$ represent the digital raster image in the left photograph 50 and $I_R(x, y)$ represent the digital raster image in the right photograph 52, a degree of correlation is evaluated using an image patch covering a contiguous region $A_L$ of size $A$ centered at a point feature $(x_0, Y_0)$ and a second image patch covering a contiguous region $A_R$ of the same size $A$ centered at a point feature $(x_t, Y_t)$ by $$c(x_t, y_t)=[\int I_L(x-x_0, y-y_0)I_R(x-x_t, y-y_t)dx\,dy]/[\int I^2_L(x-x_0, y-y_0)\,dx\,dy]^{1/2}/[\int I^2_R(x-x_t, y-y_t)\,dx\,dy]^{1/2}.$$

The correlation criteria 108 is satisfied if a degree of correlation of the highest value is greater than a predetermined threshold. If none of the degree of correlation is above the specified threshold, the entry of interest from the first list 94 is discarded. If there are more than one results in the calculation of degree of correlation that are greater than the specified threshold, a trial image patch associated with an entry from the second list 96 that produced the highest degree of correlation with the first image patch are kept, along with the entry of interest from the first list of edge-feature photograph coordinates 94, to accumulate the common list of point and edge features 100. When the merge list process is completed, all the entries in the first list of edge-feature photograph coordinates 94 that are retained form the first list of photograph coordinates 28 for the common point and edge features. Each entry in the first list of photograph coordinates 28 for the common point and edge features has a corresponding entry in the second list of edge-feature photograph coordinates 96. The common entries in the second list of edge-feature photograph coordinates 96 form the second list of photograph coordinates 30 for the common point and edge features. Notice that the photograph coordinates stored in the second list of photograph coordinates 30 for the common point and edge features are not restricted to be discrete row and column values. Fractional values in photograph coordinates are obtained by constructing a polynomial curve, such as cubic spline, to fit a series of samples of the degree of correlation $c(x_t, Y_t)$ at discrete locations, and solving for the coordinates with maximum correlation by a method of interpolation. Applying the correlation evaluation and interpolation technique back for the first list of edge-feature photograph coordinates 94 will increase the precision of the photograph coordinates stored in the first list of photograph coordinates 28 for the common point and edge features.

Figure 6:
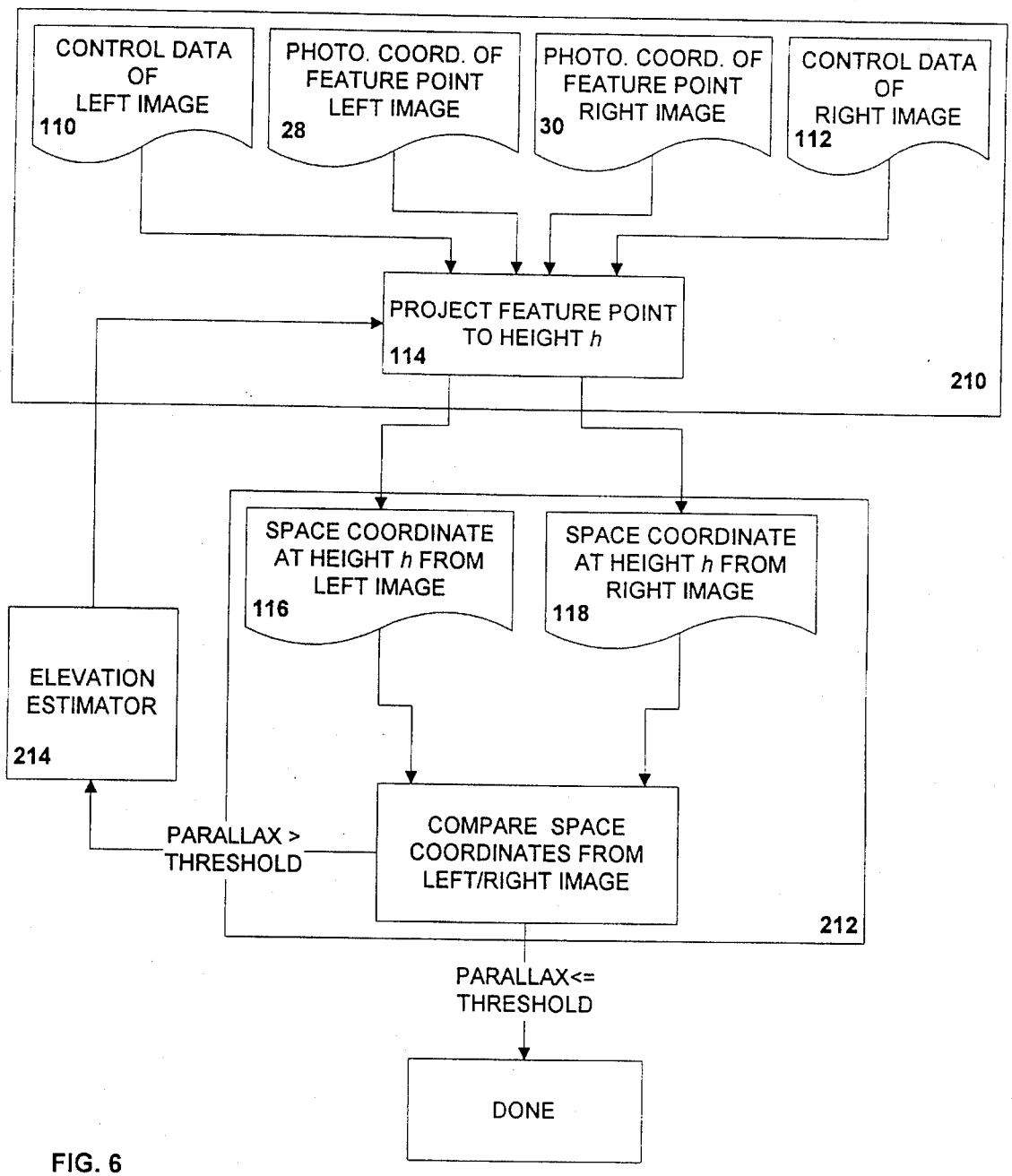
FIG. 6 is a block diagram illustrating the steps of determining the elevation of a feature point in the common list of point and edge features.
Figure 7:
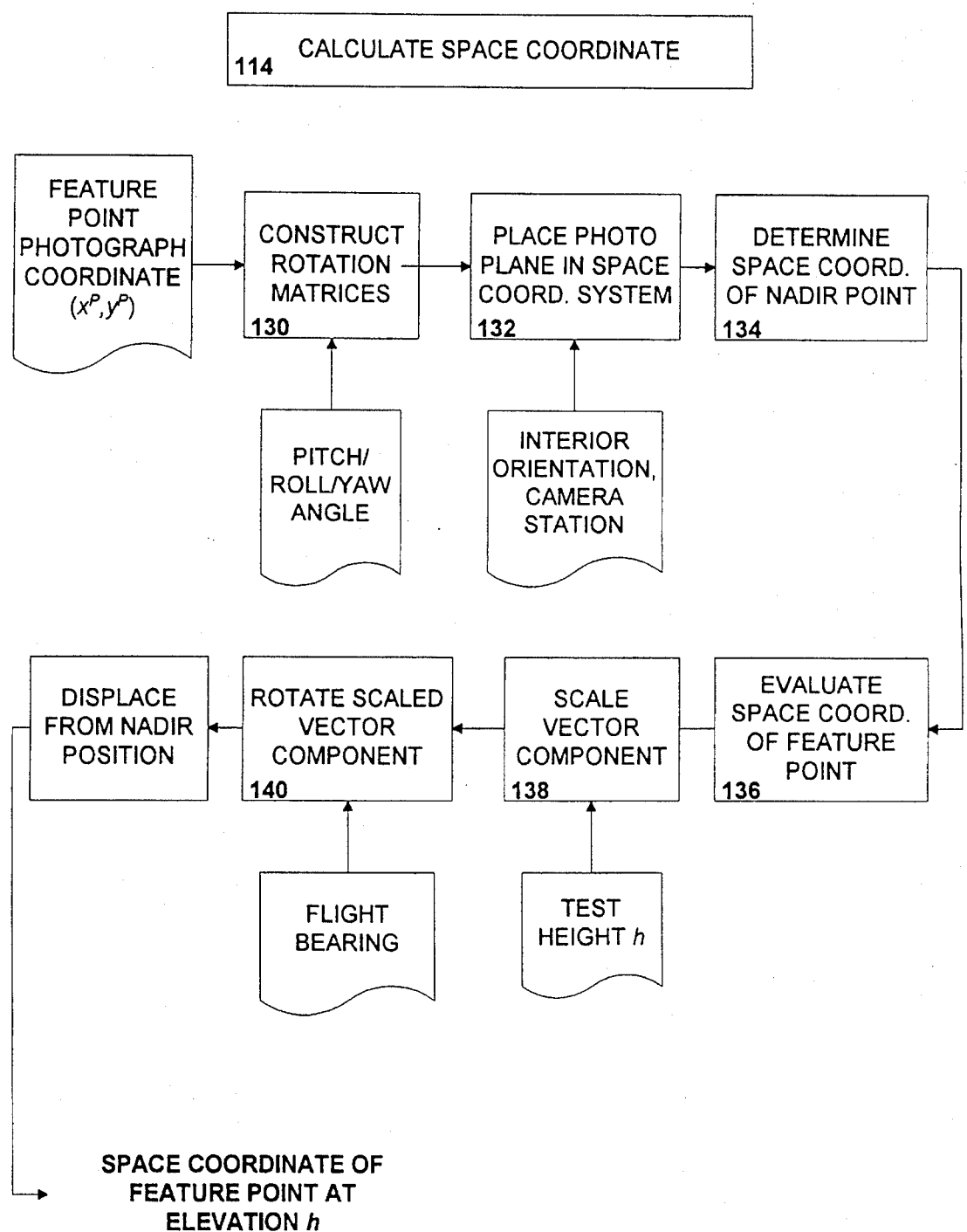
FIG. 7 is a block diagram illustrating the steps of calculating a space coordinate for a feature point in an image.

FIG. 6 is a diagram showing the elevation determination process 32 that includes the projection stage 210, the coordinate comparator 212, and the elevation estimator 214 to determine the elevation for a point feature S in the common list of point and edge features 100. The projection stage 210 utilizes a space coordinate projection process 114 that takes an entry from the first list of photograph coordinates of common feature points 28 and a first set of airborne control data 110 for the left photograph 50 to project onto a horizontal projection plane 84 at a height h above the reference Datum 82. The space coordinate projection process 114 calculates a three dimensional space coordinate 116 for the feature point S projected onto the projection plane 84 at a height h above the reference Datum 82. The space coordinate projection process 114 also uses a second entry from the second list of photograph coordinates of common feature points 30 and a second set of airborne control data 112 for the right photograph 52 to calculate a second space coordinate 118 for the feature point S projected onto the projection plane 84. The coordinate comparator 212 calculates an object-space parallax σ(h) between the stereo pair of space coordinates 116 and 118. The object-space parallax σ(h) is evaluated against a predetermined convergence threshold. If the object-space parallax σ(h) is less or equal than the convergence threshold, the height value h is accepted as the elevation with respect to the reference Datum 82 for the feature point S whose elevation is sought. If the object-space parallax σ(h) is greater than the convergence threshold, the height h of the projection plane 84 is revised to a new value by the elevation estimator 214. The space coordinate projection process 114 and the coordinate comparator 212 are repeated to validate the consistency of the elevation estimator 214.

Referring to FIGS. 2, 3, and 6, the airborne control data 110 for the left photograph 50 and the airborne control data 112 for the right photograph 52 consist of three dimensional space coordinates, referenced to the reference Datum 82, for each camera stations $O_L$ and $O_R$, the interior orientation parameters and calibration data for the camera, respective roll angle ω, respective pitch angle φ, respective yaw angle κ for both photographs, and respective flight bearing angle ξ of both photographs.

Referring to FIGS. 2, 3, 7, and 8, and using the left photograph 50 to simplify the following discussion, the space coordinate projection process 114 utilizes a series of transformations that include translation, scaling, and rotations to generate a space coordinate on a projection plane 84 at a height h above the reference Datum 82 for the feature point S with photograph coordinate $(x^p, y^p)$. The series of transformations consist of the following sequence of steps: (a) constructing rotational matrices 130 that transform space coordinates between a tilted coordinate system 80 to a coordinate system with a vertical z-axis and a new x-axis parallel to the flight bearing direction $O_L B$; (b) placing the tilted photograph of interest in place 132 at the principal point $P_L$ in the three dimensional space coordinate system of the physical space, according to the set of camera parameters that include interior orientation and calibration data of the camera, the flight bearing angle, and the attitude angles of the photograph of interest; (c) determining the space coordinate of the nadir point $Q_L$ of said tilted photograph 134; (d) evaluating the space coordinate for the feature point S of interest 136 in physical space and the components of a horizontal displacement vector between a point S' to the feature point S; (e) scaling the horizontal displacement vector S'S 138 with a scale factor determined by the altitude of the camera station $O_L N_L$, height of the projection plane 84 h, the roll angle, the pitch angle, the yaw angle, and the camera focal length, resulting a scaled horizontal displacement vector S"S(h) on the projection plane 84; (f) rotating the scaled horizontal displacement vector S"S(h) 140 on the projection plane 84 according to the flight bearing angle to reference to due East; (g) translating the scaled, planar displacement, obtained in (f), from the nadir point on the projection plane 84 S" to obtain the space coordinate of the feature point of interest S(h) at elevation h.

Referring to FIGS. 2 and 3, the step of constructing rotational matrices 130 involves constructing a transformation matrix $T_1$ to relate from the tilted photograph coordinate system 80 to a coordinate system oriented along the vertical axis (new z-axis) and $O_L B$ (new x-axis). The transformation matrix $T_1$ is given by

| $\cos \kappa \cos \phi + \sin \kappa \sin \phi \sin \omega,$ | $-\sin \kappa \cos \omega,$ | $-\cos \kappa \sin \phi + \sin \kappa \cos \phi \sin \omega,$ |
|---|---|---|
| $\sin \kappa \cos \phi - \cos \kappa \sin \phi \sin \omega,$ | $\cos \kappa \cos \omega,$ | $-\sin \kappa \sin \phi - \cos \kappa \cos \phi \sin \omega,$ |
| $\sin \phi \cos \omega,$ | $\sin \omega,$ | $\cos \phi \cos \omega.$ |

Thus the space coordinate of the principal point $P_L$ of the left photograph 50 is displaced from the left camera station $O_L$ by ($f \cos \kappa \sin \phi - f \sin \kappa \cos \phi \sin \omega$, $f \sin \kappa \sin \phi + f \cos \kappa \cos \phi \sin \omega$, $-f \cos \phi \cos \omega$), where $f$ is the focal length of the camera.

The step 132 of placing the tilted left photograph 50 in place involves positioning the left photograph 50 in its original tilted orientation with the principal point $P_L$ of the left photograph displaced from $O_L$ by ($f \cos \kappa \sin \phi - f \sin \kappa \cos \phi \sin \omega$, $f \sin \kappa \sin \phi + f \cos \kappa \cos \phi \sin \omega$, $-f \cos \phi \cos \omega$), where $f$ is the focal length of the camera. The row and column number of the photograph coordinate is scaled by a pixel center-to-center distance to account for the physical size of the detector.

Referring to FIG. 3, the step 134 of determining the space coordinate of the nadir point $Q_L$ of the tilted left photograph 50 involves solving a pair of unknown x, y from the following equation:

$$x(\cos \kappa \cos \phi + \sin \kappa \sin \phi \sin \omega) + y (-\sin \kappa \cos \omega) + f (-\cos \kappa \sin \phi + \sin \kappa \cos \phi \sin \omega) = 0 \quad (1)$$

$$x(\sin \kappa \cos \phi - \cos \kappa \sin \phi \sin \omega) + y (\cos \kappa \cos \omega) + f (-\sin \kappa \sin \phi - \cos \kappa \cos \phi \sin \omega) = 0. \quad (2)$$

The solution $(x^{p,n}, y^{p,n})$ is the photograph coordinate of the nadir point $Q_L$ of the left photograph 50. The distance $O_L Q_L$ from the nadir point of the left photograph to $O_L$ is given by $x^{p,n} (\sin \phi \cos \omega) + y^{p,n} (\sin \omega) + f \cos \phi \cos \omega$.

The step 136 of evaluating the space coordinate of the feature point of interest S on the tilted left photograph 50 with coordinate $(x^p, y^p)$ involves calculating the displacement of the feature point of interest S from $O_L$, which is given by $(x^p(\cos \kappa \cos \phi + \sin \kappa \sin \phi \sin \omega) + y^p(-\sin \kappa \cos \omega) + f(-\cos \kappa \sin \phi + \sin \kappa \cos \phi \sin \omega),$ $x^p(\sin \kappa \cos \phi - \cos \kappa \sin \phi \sin \omega) + y^p(\cos \kappa \cos \omega) + f(-\sin \kappa \sin \phi - \cos \kappa \cos \phi \sin \omega),$ $x^p(\sin \phi \cos \omega) + y^p(\sin \omega) + f \cos \phi \cos \omega).$ The horizontal displacement vector S'S is then equal to $(x^p(\cos \kappa \cos \phi + \sin \kappa \sin \phi \sin \omega) + y^p(-\sin \kappa \cos \omega) + f(-\cos \kappa \sin \phi + \sin \kappa \cos \phi \sin \omega),$ $x^p(\sin \kappa \cos \phi - \cos \kappa \sin \phi \sin \omega) + y^p(\cos \kappa \cos \omega) + f(-\sin \kappa \sin \phi - \cos \kappa \cos \phi \sin \omega),$ The step 138 of scaling the horizontal displacement vector S'S involves scaling the x-y component by a magnification factor M, which is shown in FIG. 8 to be equal to $O_L S''/O_L S'$. The magnification factor M is given by $$M = (H-h)/(x^p(\sin \phi \cos \omega) + y^p(\sin \omega) + f \cos \phi \cos \omega), \quad (3)$$

where H is the altitude of the camera station $O_L$, h is the height value of the projection plane 84. The result is a scaled, horizontal displacement vector $(D_x, D_y)$ on the projection plane, given by:

$$D_x = M(x^p(\cos \kappa \cos \phi + \sin \kappa \sin \phi \sin \omega) + y^p(-\sin \kappa \cos \omega) + f(-\cos \kappa \sin \phi + \sin \kappa \cos \phi \sin \omega)), \quad (4)$$

$$D_y = M(x^p(\sin \kappa \cos \phi - \cos \kappa \sin \phi \sin \omega) + y^p(\cos \kappa \cos \omega) + f(-\sin \kappa \sin \phi - \cos \kappa \cos \phi \sin \omega)), \quad (5)$$

where the x axis is parallel to $O_L B$ shown in FIG. 2.

Referring to FIGS. 2 and 3, the step 140 of rotating the horizontal displacement vector $(D_x, D_y)$ on the projection plane according to the flight bearing angle to reference to due East involves applying a rotational matrix to transform from a coordinate system whose x-axis is parallel to $O_L B$ to an East-North coordinate system, resulting in a new pair of planar component given by:

$$D^L_x = D_x \cos \xi - D_y \sin \xi \quad (6)$$

$$D^L_y = D_x \sin \xi + D_y \cos \xi, \quad (7)$$

where $\xi$ is the flight bearing angle in a East-North coordinate system. The space coordinate of the feature point S projected from the left photograph 50 onto the projection plane 84 at elevation h, written as $S_L(h)$, is given by $$S_L(h) = (x_o^L + D^L_x, y_o^L + D^L_y, h), \quad (8)$$

where $(x_o^L, y_o^L, H)$ is the space coordinate of the camera station of the left photograph 50. A similar calculation is done for the feature point S using the right photograph 52 to yield a second spaced coordinate $S_R(h) = (x_o^R + D^R_x, y_o^R + D^R_y, h)$ of the feature point projected onto the projection plane 84 at elevation h, where $(x_o^R, y_o^R, H_R)$ is the space coordinate of the camera station of the right photograph 52.

Referring to FIG. 2, the space coordinate comparator 212 calculates a variance by the expression below:

$$V(h) = \sigma^2(h) = (x_o^R + D^R_x - x_o^L - D^L_x)^2 + (y_o^R + D^R_y - y_o^L - D^L_y)^2. \quad (9)$$

The object-space parallax $\sigma(h)$ is equal to the square root of the variance V (h). If the object-space parallax $\sigma(h)$ is less than a predetermined convergence threshold, the value of h is sufficiently close to the true elevation of the feature point S as required by the criteria of the convergence threshold. If the object-space parallax $\sigma(h)$ is greater than the predetermined convergence threshold, the true elevation is estimated to have the value h' given by $$H' = \text{sign} (-x_o^R - D^R_x + x_o^L + D^L_x) (\sigma(h)) (H/(\sigma(h) + O_L B)) + h. \quad (10)$$

After one iteration, the object-space parallax is greatly reduced. The estimated elevation h' should produce an object-space parallax that is equal or less than the predetermined convergence threshold, resulting in an acceptably accurate space coordinate S (h') for the feature point S. The object-space parallax σ(h'), which is evaluated for a new projection plane at height h', is a measure of accuracy of the estimated elevation value for the feature point S. In the unusual case that the new object-space parallax σ(h') did not decrease significantly from the previously evaluated result σ(h) or below the convergence threshold, the specified convergence threshold is too restrictive for the stereo image pair and associated sets of control data. In this case, the accuracy of elevation that can be determined from the stereo image pair and associated sets of airborne control data will be no better than those associated with the value of the object-space parallax σ(h'). The best-estimate elevation value for the feature point S is then equal to h'. Thus, for each pair of photograph coordinate $(x^p, y^p)_L$ of the left photograph 50 that corresponds to an entry in the common list of point and edge features 100, a three dimensional space coordinate S (h'), referenced to a known reference Datum 82, is obtained. The three dimensional space coordinate S (h') is also cross-referenced to a pair of photograph coordinate $(x^p, y^p)_R$ of the right photograph 52. After all the entries in the common list of point and edge features 100 are enumerated, a complete list of digital elevation values, each of which is anchored to a pair of geo-referenced coordinates is generated autonomously.

The complete list of digital elevation values indexed to both geo-referenced coordinates and photograph coordinates constitutes the digital elevation database 34. The digital elevation database 34 is stored through the output stage 218, using conventional computer input/output techniques, onto a storage medium in the second storage device 220.

The accuracy of elevation estimator 214 depends on several factors: (a) the quality and consistency of the geometric fidelity of the photographs or image dam, (b) the positioning accuracy of the camera station, (c) the angular accuracy of the roll/pitch/yaw/bearing data. Poor geometric fidelity of images will seriously affect the effectiveness of the elevation estimator 214. Frame imaging sensor data and photographs are most desirable in this respect. Image data from pushbroom sensors may be adequate and suitable for use under the present invention if attitude information of the sensor is recorded for every individual row of the image scene. Image data from scanning sensors will not be suitable for processing by the present invention, because each individual pixels are exposed at different times and associated with different attitude angles that are not completely known.

Current practice of using kinematic GPS receivers can provide positioning accuracy of camera stations of the orders of a few centimeters or less. The attitude data of each photograph or image data from digital imaging sensors may originate either from direct measurement or analytical aerotriangulation. In the case of analytical aerotriangulation, an angular accuracy in the neighborhood of 10⁻20 microradians can be achieved. For a large scale mapping application that was flown at a height of 450 meter, the errors resulting from angular uncertainty is about 1⁻0.5 cm. In the case of direct measurement of raw/pitch/yaw angles, angular accuracy of the order of 300 microradians is achievable, implying a corresponding elevation error of the order of 15 cm.

The precision of elevation determination is affected by the physical dimension of field of view of a pixel on the ground. Although, digital raster images are addressed in discrete column and row numbers, the photograph coordinate of image features that are derived using correlation methods can have fractional, sub-pixel values. Thus, the resolution of digital elevation determination is not limited to the product of ground sampling distance (GSD) times flight height divided by photo base, or GSD/base-to-height ratio.

ADDITIONAL EMBODIMENTS

Figure 9A:
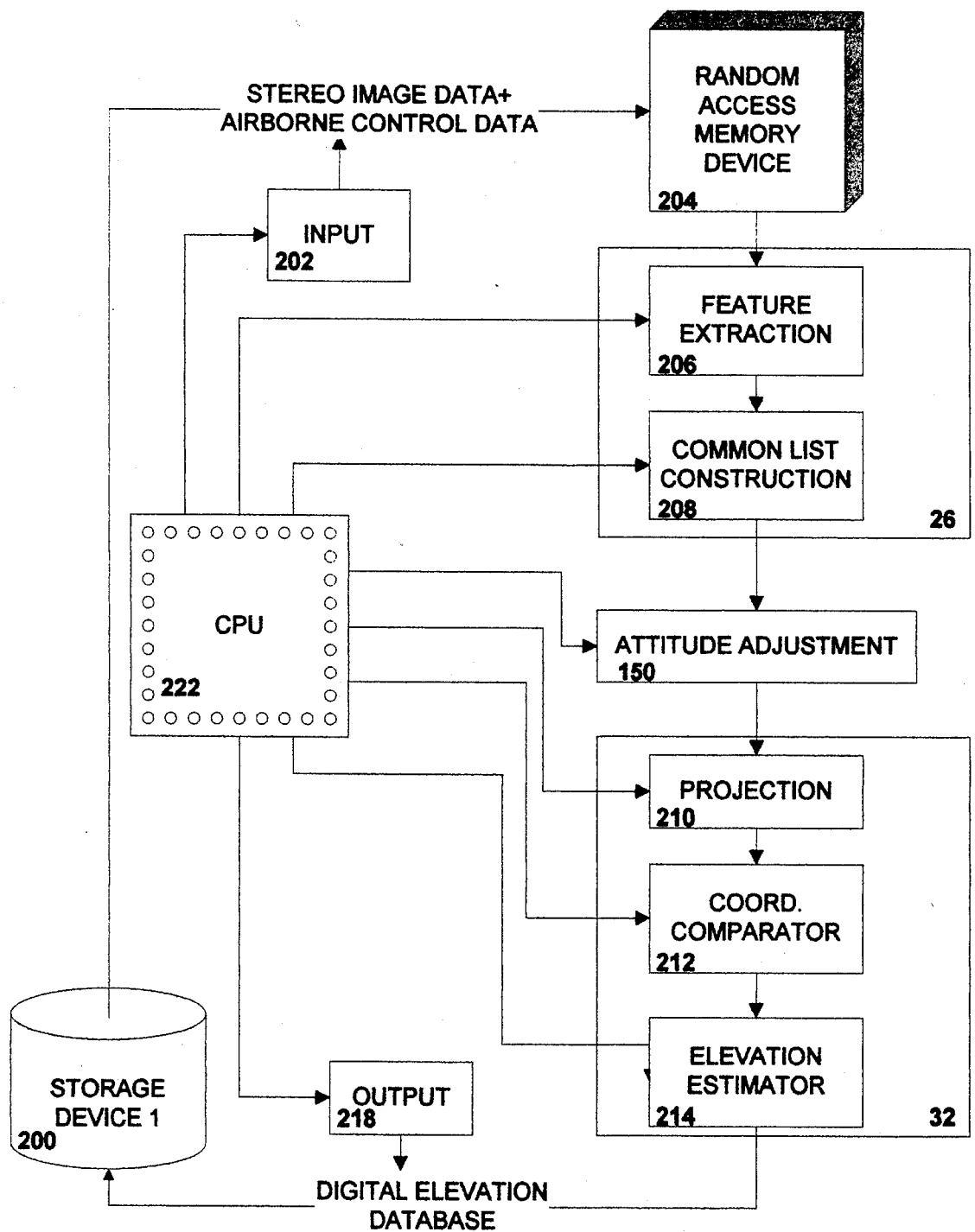
FIG. 9A shows the structure of additional embodiment of an apparatus that self-calibrates attitude angles and automates extraction of digital elevation from a pair of stereo images.

FIG. 9A shows additional embodiments of the apparatus for extracting digital elevation from at least one pair of stereo images and associated sets of airborne control data. Referring to FIG. 9A, the storage device 200 supplies input data and archives digital elevation output. An attitude adjustment stage provides a means to verify the consistency of attitude angles and to improve the accuracy of the roll/pitch/yaw/bearing angles of the airborne control data.

Figure 9B:
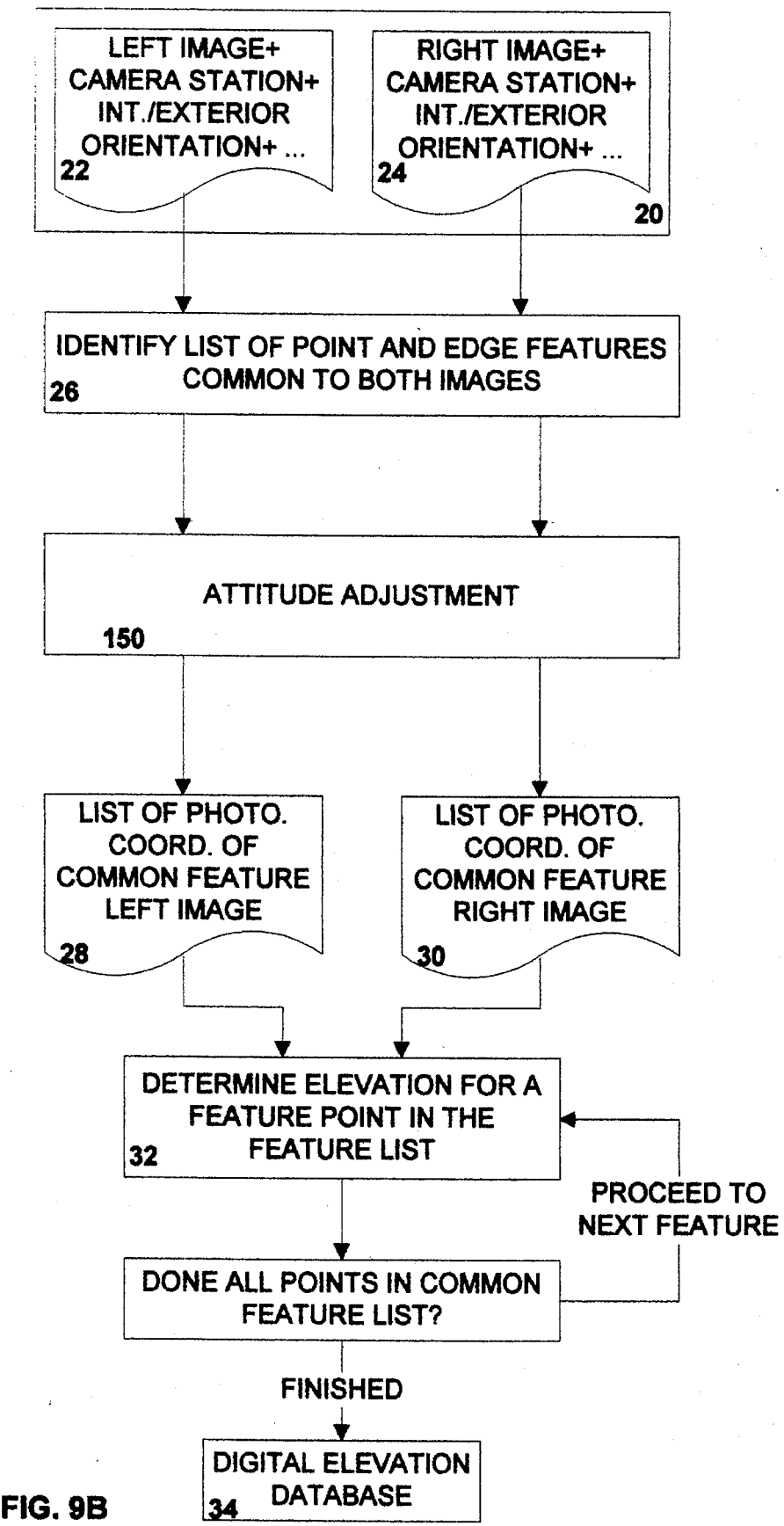
FIG. 9B is a block diagram showing additional embodiment of the processes of automated extraction of digital elevation from a pair of stereo images by including an attitude adjustment step.

FIG. 9B shows additional embodiments of the method that includes an attitude adjustment process 150 to self-calibrate and modify the roll/pitch/yaw/bearing angles of the first set of airborne control data 110 for the left photograph 50, and the roll/pitch/yaw/bearing angles of the second set of airborne control data 112 for the right photograph 52. The attitude adjustment process 150 self-calibrates for consistency of the roll/pitch/yaw/heading angles of the airborne control data. In addition, the attitude adjustment process 150 improves the accuracy of the roll/pitch/yaw/bearing angles for the case of directly measured airborne control data.

Figure 10:
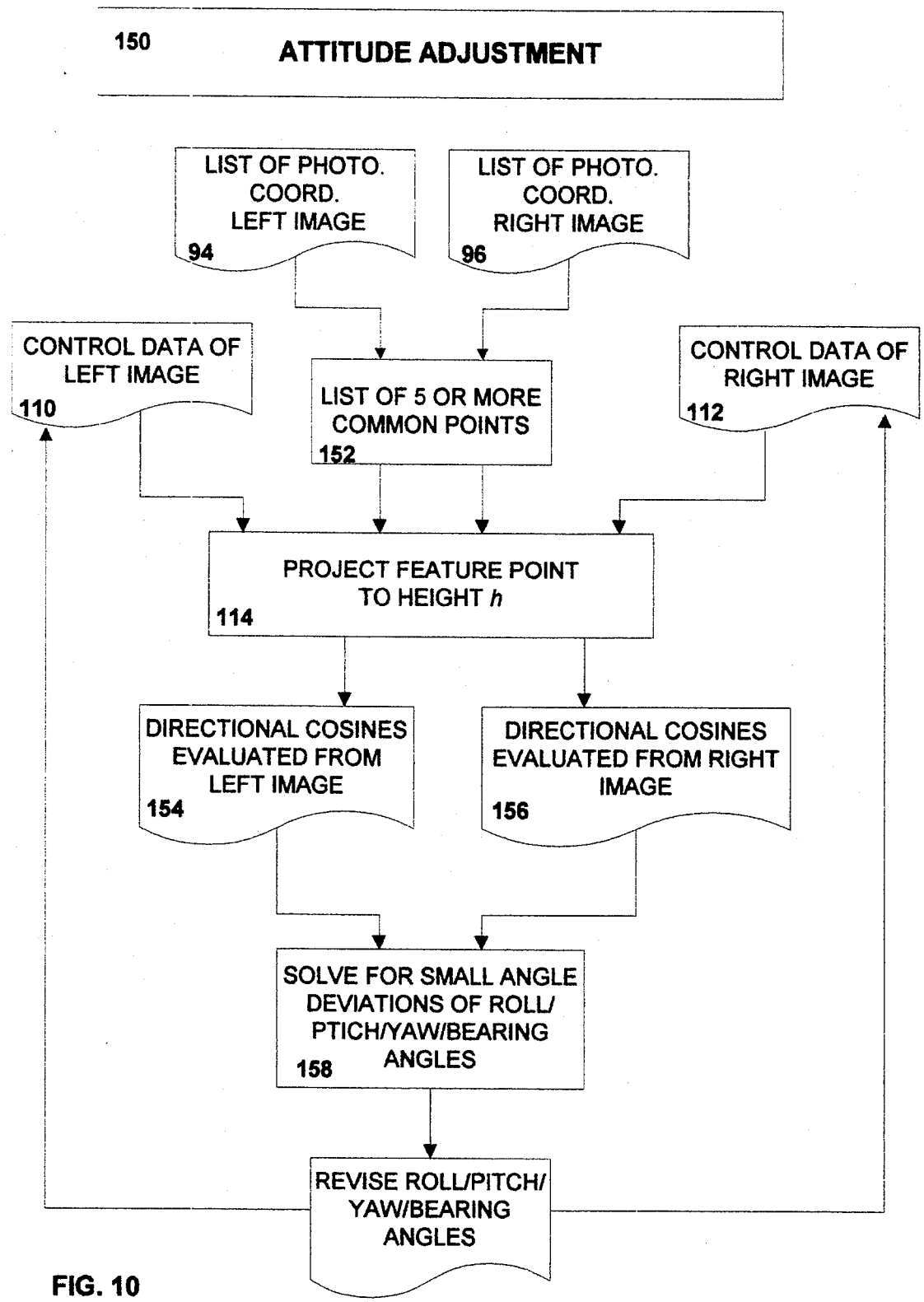
FIG. 10 is a block diagram illustrating a process of solving for small angle corrections to the attitude angles for both the left and right images of a stereo image pair.

Referring to FIG. 10, the attitude adjustment process 150 uses a list of 5 photograph coordinates 152 of non-contiguous, non-collinear control points that are common to the stereo image pair 20, the first set of airborne control data 110, the second set of airborne control data 112, and the space coordinate projection process 114 to evaluate the directional cosines, projected on the reference Datum plane with respect to due East, for each line segment connected by two points on the left photograph 50. The directional cosines, projected from the right photograph 52 on the reference Datum plane with respect to due East, are also calculated for each line segment on the right photograph 52. A first set of 8 directional cosines 154 is obtained for the left photograph 50. A second set of 8 directional cosines 156 is also obtained for the right photograph 52. Making use of the fact that the bearing angle with respect to due East on the reference Datum plane for any two terrestrial point features is an invariant. A small angle correction process 158 solves for small angle correction terms for each angular variable of the two sets of roll/pitch/yaw/bearing angles. The small angle correction solutions are then applied to the corresponding angles in the first set of airborne control data 110 and second set of airborne control data 112 to achieve improved accuracy of the attitude angles.

The list of photograph coordinates of 5 isolated control points 152 is obtained using similar procedures that are described in the merge-list process 98, with the set of criteria 104 including additional criteria that (a) each pair of points are sufficiently apart, (b) any combination of three points are not collinear on the photograph. This is depicted in FIG. 11 as the points $J_1, J_2, J_3, J_4, J_5$, for example. The space coordinates for $J_1, J_2, J_3, J_4, J_5$ are calculated according to steps described in the space coordinate projection 114. A directional cosines projected from the left photograph 50 on a plane parallel to the reference Datum plane with respect to due East is calculated for each pair of points, $J_1J_2, J_1J_3, J_1J_4, J_1J_5, J_2J_3, \ldots$ A second set of directional cosines is also calculated using the right photograph 52, using the second set of associated airborne control data 112. Since the direction cosine on the reference Datum plane with respect to due East for any line segment $J_iJ_j$, $i \neq j$, is invariant when projected either from the left photograph 50 or from the right photograph 52. The small angle correction terms to each of the eight angular parameters (roll/pitch/yaw/heading for both photograph) is obtained by (a) equating eight matching pairs of directional cosines, one from each photograph of the same line segment to generate eight equations;

(b) expanding each angular variable using a perturbation approximation, and using a notation $\gamma = \gamma_0 + \delta\gamma$, where $\gamma_0$ is the original value of the angular variable, $\delta\gamma$ is a small angle correction term, and $\gamma$ is the true value of the angular variable. Thus $\cos\gamma$ is approximated by $\cos\gamma_0 - \delta\gamma \sin\gamma_0$, and $\sin\gamma$ is approximated by $\sin\gamma_0 + \delta\gamma \cos\gamma_0$. Using the small angle approximation, the eight equations relating the directional cosines is reduced to 8 linear equations of the 8 small angle correction terms. Thus, the small angle correction for each angular variable is obtained by linear algebraic solutions that is well known in the art. Also, the small angle approximation applies equally well to near-vertical photography and to oblique photography.

Figure 12:
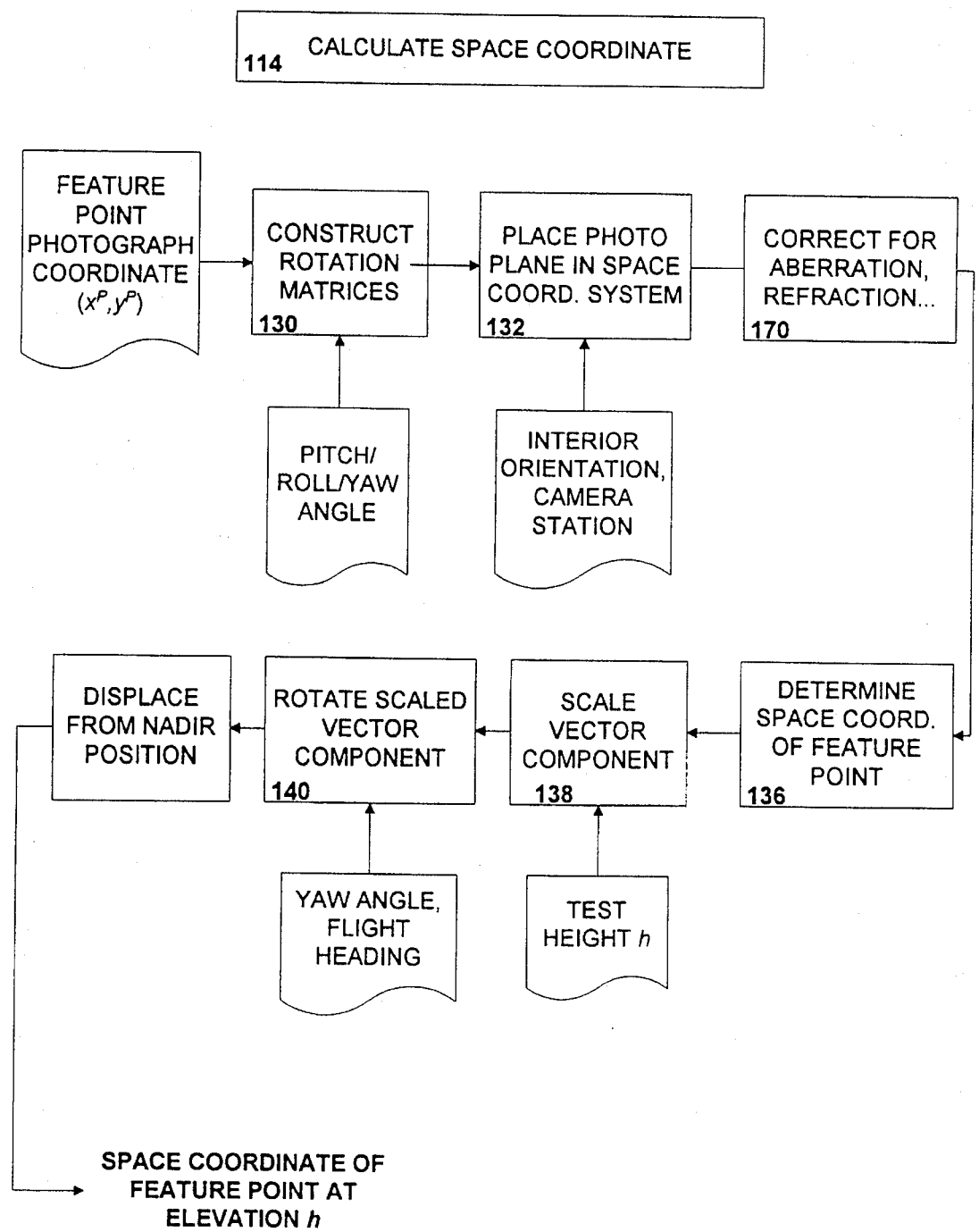
FIG. 12 shows another embodiment in the space coordinate calculation that includes a step to correct for aberration and atmospheric refraction effects.

FIG. 12 shows still additional embodiments in the space coordinate projection process 114 that includes a step 170 to correct for aberration of camera optics, curvature of the earth's surface, and effects of atmospheric refraction. The aberration and refraction correction step 170 involves transforming photograph coordinates according to prescribed polynomial formulas, which has been discussed in U.S. Pat. No. 3,116,555.

SUMMARY, RAMIFICATION, AND SCOPE

The present invention automates the process of extracting digital elevation databases from a pair of stereo digital raster images using airborne control data associated with each image. Any number of stereo pairs of raster images can be processed autonomously to generate digital elevation databases covering larger areas of terrain. The extraction of elevation information from stereo pairs of raster images is accomplished without the use of stereoscopic viewing devices, floating markers, ground control data from field survey or digitizing maps. No operator direction is required to supervise the elevation extraction process.

From the description of above, a number of advantages of the invention becomes evident:

(1) The present invention disclosed a method and an apparatus for extracting elevation information from raster images that can be either digitized film image or raw image data directly from digital imaging sensors.

(2) The present invention does not require any ground control data that must be obtained by conducting a ground survey or digitizing maps.

(3) The present invention does not require any stereo viewing equipment, nor relies on stereo viewing perception by an operator.

(4) In the present invention, terrain elevation is determined algebraically, no manual process of setting up a stereo model by removing the y-parallax between a stereo image pair is required.

(5) Digital elevation data is extracted directly from uncorrected images or from mission medium containing unprocessed data.

(6) The present invention extracts elevation information for image features that have good contrast, allowing distinct geo-physical features (such as terrain breaks) to be included in the digital elevation database output. The accuracy of autonomous generation of digital elevation database is increased by the inclusion of all distinct geo-physical features that have good image contrast.

(7) The present invention is directly applicable to both near-vertical and oblique photographs.

(8) The cost of extracting elevation information from raw image data is greatly reduced by eliminating the need for ground survey, eliminating the use of stereo viewing devices.

It is noted that the exemplary embodiments of the invention described herein in detail for exemplary purposes are of course subject to many different variations in structure, design, application and methodology. Because many varying and different embodiments may be made within the scope of the inventive concept(s) herein taught, and because many modifications may be made in the embodiments herein detailed in accordance with the descriptive requirements of the law, it is to be understood that the details herein generally are to be interpreted as illustrative and not in a limiting sense.

Thus, for example, while the preferred, exemplary embodiment describes a method and an apparatus that extracts elevation from digital raster images autonomously, it is within the scope of the present invention to utilize raster images of a general format of a frame size of m columns by n rows. Thus not only digital frame imaging sensor data but also pushbroom sensor data (which is m columns by 1 row) are subject to the benefits of the present invention.

Thus the scope of the invention should be determined by the appended claims and their legal equivalents, rather than by the specifics of the examples given.

What is claimed is:

1. A method of extracting topographic elevation from two partially overlapping images of terrain and two corresponding sets of airborne control data including respective camera stations, a set of camera parameters, respective roll angles, respective pitch angles, respective yaw angles, respective flight bearing angle, associated with each image stored in a random access memory device comprising the steps of:

(a) identifying point and edge features in both the left image and the right image of said pair of images, (b) constructing a list of common features containing a first list of left photograph coordinates of common features in said left image and a second list of right photograph coordinates of common features in said right image, (c) projecting a common feature point in said left image from a left camera station onto a horizontal plane at a height h above a reference Datum plane, (d) calculating a first space coordinate of the projection of said common feature point onto said horizontal plane from said left image using the first set of airborne control data associated with said left image, (e) projecting said common feature point in said right image from a right camera station onto said horizontal plane, (f) calculating a second space coordinate of the projection of said common feature point onto said horizontal plane from said right image using the second set of airborne control data associated with said right image, (g) calculating an object space parallax between said first space coordinate and said second space coordinate, (h) estimating the true elevation h' of said common feature point from said object-space parallax, a base length, and the attitude of said left camera station, (i) repeating the steps (c) and (d) where said feature point is projected onto a new horizontal plane at height h' above said reference Datum to obtain a best three dimensional space coordinate of said feature point at elevation h', (j) repeating the steps (c) through (i) for each common feature point in said list of common features.

2. The method of claim 1, wherein there is further included the step of:

adjusting both sets of roll angles, pitch angles, yaw angles, flight bearing angles for said left image and said right image according to a set of solutions of small angle correction terms to said first set of roll angle, pitch angle, yaw angle, bearing angle from step (d) and to said second set of roll angle, pitch angle, yaw angle, bearing angle from step (f).

3. The method of claim 1, wherein in step (a) the step of identifying includes:

filtering both said left image and said right image with edge enhancing band pass filters.

4. The method of claim 1, wherein in step (b) the step of constructing includes:

evaluating image correlation on respective image patches from said left image and said right image to identify point and edge features common to both images.

5. The method of claim 1, wherein there is further included the step of:

storing a list of said best three dimensional space coordinates referenced to said reference Datum plane for all common feature points in said list of common features from step (j).

6. A method of extracting topographic elevation from two partially overlapping images of terrain and two corresponding sets of airborne control data including respective camera station, a set of camera parameters, respective roll angle, respective pitch angle, respective yaw angle, respective flight bearing angle, associated with each image stored in an unprocessed mission media comprising the steps of:

(a) retrieving both images and said both sets of airborne control data from said mission medium into a random access memory device, (b) identifying point and edge features in both the left image and the right image of said pair of images, (c) constructing a list of common features containing a first list of left photograph coordinates of common features in said left image and a second list of right photograph coordinates of common features in said right image, (d) projecting a common feature point in said left image from a left camera station onto a horizontal plane at a height h above a reference Datum plane, (e) calculating a first space coordinate of the projection of said common feature point onto said horizontal plane from said left image using the first set of airborne control data associated with said left image, (f) projecting said common feature point in said right image from a right camera station onto said horizontal plane, (g) calculating a second space coordinate of the projection of said common feature point onto said horizontal plane from said right image using the second set of airborne control data associated with said right image, (h) calculating an object space parallax between said first space coordinate and said second space coordinate, (i) estimating the true elevation h' of said common feature point from said object-space parallax, a base length, and the attitude of said left camera station, (j) repeating the steps (d) and (e) where said feature point is projected onto a new horizontal plane at height h' above said reference Datum to obtain a best three dimensional space coordinate of said feature point at elevation h', (k) repeating the steps (d) through (j) for each common feature point in said list of common features.

7. The method of claim 6, wherein there is further included the step of:

adjusting both sets of roll angles, pitch angles, yaw angles, bearing angles for said left image and said right image according to a set of solutions of small angle correction terms to said first set of roll angle, pitch angle, yaw angle, bearing angle from step (e) and to said second set of roll angle, pitch angle, yaw angle, bearing angle from step (g).

8. The method of claim 6, wherein in step (b) the step of identifying includes:

filtering both said left image and said right image with edge enhancing band pass filters.

9. The method of claim 6, wherein in step (c) the step of constructing includes:

evaluating image correlation on respective image patches from said left image and said right image to identify point and edge features common to both images.

10. The method of claim 6, wherein there is further included the step of:

storing a list of said best three dimensional space coordinates referenced to said reference Datum plane for all common feature points in said list of common features from step (k).

11. A stereocomparator for extracting topographical elevation information from digital image data and related airborne control data stored in a unprocessed mission media comprising:

(a) a storage device containing said mission data medium storing at least one set of two partially overlapping images of terrain and two corresponding sets of airborne control data including respective camera station, a set of camera parameters, respective roll angle, respective pitch angle, respective yaw angle, respective flight bearing angle, associated with each image, (b) an input means for retrieving said pair of images and said two corresponding sets of airborne control data into a random access memory device, (c) a feature extraction means for identifying point and edge features in both the left image and the right image of said pair of images, (d) a common list construction means for constructing a list of common features containing a first list of left photograph coordinates of said common features in said left image and a second list of right photograph coordinates of said common features in said right image, (e) a projection means for projecting a common feature point in said left image from a left camera station onto a horizontal plane at a height h above a reference Datum plane and calculating a first space coordinate from left image projection, and projecting said common feature point in said right image from a right camera station onto said horizontal plane and calculating a second space coordinate from right image projection, (f) a coordinate comparator means for calculating an object space parallax between said first space coordinate and said second space coordinate, (g) a elevation estimator means for estimating the true elevation of said common feature point from said object space parallax, a base length, and the attitude of said left camera station.

12. A stereocomparator as defined in claim 11, wherein said projection means further includes an attitude adjustment means for:

adjusting both sets of roll angles, pitch angles, yaw angles, bearing angles for said left image and said right image according to a set of solutions of small angle correction terms to said sets of roll angles, pitch angles, yaw angles, bearing angles.

13. A stereocomparator as defined in claim 11, wherein said feature extraction means includes a band-pass filtering means for:

filtering both said left image and said right image to extract point and edge features.

14. A stereocomparator as defined in claim 11, wherein further includes an output means for:

storing a list of three dimensional space coordinates referenced to said reference Datum plane.

* * * * *